Aug. 25, 1959  A. A. BROWN ET AL  2,901,716
VARIABLE INDUCTOR
Filed March 4, 1954
FIG. 1
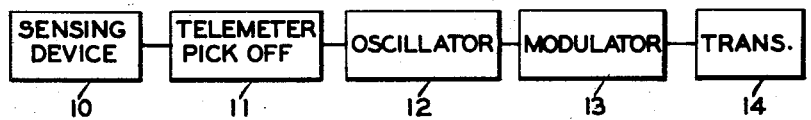
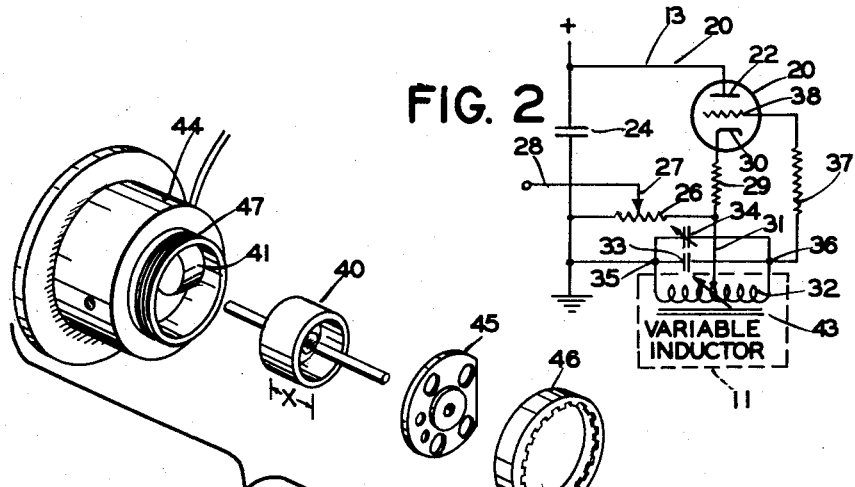
FIG. 3
FIG. 5
FIG. 4
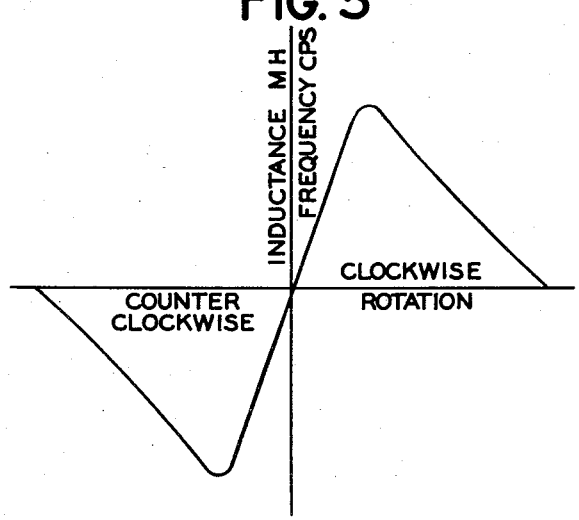
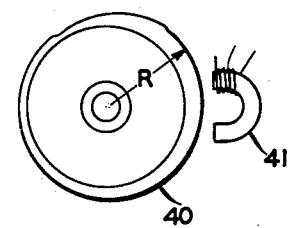
INVENTORS
*ABBOTT A. BROWN*
*ROBERT M. DE LUCA*
BY *Oscar B Brumback*
ATTORNEY

United States Patent Office 2,901,716
Patented Aug. 25, 1959

2,901,716

VARIABLE INDUCTOR

Abbott A. Brown, Paramus, and Robert M. De Luca, Bloomfield, N.J., assignors to Bendix Aviation Corporation, Teterboro, N.J., a corporation of Delaware Application March 4, 1954, Serial No. 413,997

6 Claims. (Cl. 336—135)

This invention relates generally to telemetering systems and more particularly to pick-up units for telemetering systems.

Frequently, knowledge at a remote location is required of the condition of an object as measured by a sensing device. For example, it is frequently desirable that the heading of an aircraft be known at a ground station where the aircraft cannot be seen. This is often accomplished by telemetering systems by which responses corresponding to a change in a variable condition are transmitted to a remote location. A problem presented in these systems is one of accurately picking up the response of the sensing unit, such as the heading control in the above example.

An object of the present invention, therefore, is to provide a novel telemetering system having a pick-up which accurately measures the response of a sensing device.

Another object is to provide a novel pick-up whose inductance changes with change in a measured variable.

The present invention contemplates an inductive pick-up device having relatively displaceable stator and rotor elements, in which the air gap between the rotor and stator changes with relative displacement of the elements to change the inductive output of the device.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

In the single sheet of drawing wherein like figures are marked alike:

Fig. 1 illustrates in block diagram form a conventional telemetering system;

Fig. 2 illustrates schematically the novel pick-up unit of the present invention incorporated in an oscillator unit;

Fig. 3 illustrates an exploded view of the parts of the novel pick-up illustrated schematically in Figure 2;

Fig. 4 illustrates in an exaggerated fashion an end view of the rotor of the pick-up of Fig. 3; and Fig. 5 is a diagram of the change in inductance of the pick-up of Figure 3 and the change in frequency of the unit of Figure 2 with change in rotor position.

Turning now to Fig. 1, a conventional telemetering system is comprised of a condition sensing device 10, a telemetering pick-up 11, an oscillator 12, a modulator 13, and a transmitter 14. When the system is employed to transmit the heading of the craft to a remote location, sensing device 10 may be a conventional directional gyro, which, upon displacement of a craft from a desired course, actuates telemeter pick-off 11 whose action affects oscillator 12 thereby changing its frequency. This change in frequency is fed through modulator 13 to transmitter 14 where it is transmitted to a remote station which may be located on the ground. Modulator 13 and transmitter 14 may be of conventional and well known types.

In accordance with the present invention, the novel telemetering pick-off 11 is the variable inductance in an oscillator 13 which may be of the Hartley type having a conventional triode 20 whose plate 22 is energized from a suitable direct current source and is grounded through a blocking condenser 24. Connected to condenser 24 is one terminal of a potentiometer 26 whose wiper 27 supplies the output to lead 28. The other terminal of potentiometer 26 is connected by way of a resistor 29 to cathode 30 of triode 20 and by way of a lead 31 to the centertap of windings 32 of the variable inductor 11. Condensers 33 and 34 are connected across inductance windings 32. One terminal 35 of inductance windings 32 is connected to the lead grounding condenser 24 and the other terminal 36 is connected by resistor 37 to control grid 38 of triode 20.

For any given value of inductance of windings 32, capacitor 34 may be adjusted to give a set stable frequency of oscillation. Then as the inductance of variable inductor 11 changes, the frequency of oscillation changes in accordance with the expression $$f \cong 2\pi \frac{1}{\sqrt{\frac{1+\frac{R_1}{R_2}}{C(L_1+L_2+M)}}}$$

where:

$f$ = frequency in cycles per second
$R_1$ = the resistance from terminal 33 to lead 31
$R_2$ = the resistance from plate 22 to cathode 30
$L_1$ = the inductance from terminal 36 to lead 31
$L_2$ = the inductance from terminal 35 to lead 31
$C$ = the capacitance of capacitors 33 and 34
$M$ = the mutual inductance of the sections of inductor 32.

As shown in Figs. 3 and 4, the novel variable inductor 11 of the present invention comprises a rotor 40 displaceable relative to a stator 41. Stator 41 includes windings 32 wound on a U-shaped core 43. Rotor 40 is held in position in a housing 44 by an end piece 45 and a retainer 46 which screws on threads 47 on housing 44.

Rotor 40 may be of a suitable material with stable magnetic properties, and good machinability. The shell or rotor has a circumferential cam of constant width X, as shown in Fig. 3, and of variable thickness and external radius R as shown in Fig. 4. The width of the cam is preferably such as to overhang the pole faces in stator 41 and thus minimize the effects of any longitudinal vibration.

In operation, rotating rotor 40 relative to stator 41 changes the air gap between the rotor and the stator as a function of their relative displacement. This varies the flux path length through the air gap, and changes the inductance in windings 32 of variable inductor 11 and the change in inductance in the windings changes the stable oscillation frequency of oscillator 13. This is shown diagrammatically in Fig. 5 where inductance in milli-henries and frequencies in cycles per second is plotted against corresponding relative displacement of the rotor and stator. It will be noted from the diagram that the inductance changes linearly and provides sharp reversals at the maximum and minimum inductances to avoid plateau effects.

The foregoing has presented a novel pick-up device having relatively displaceable rotor and stator elements. Displacing the elements changes the flux path from the one element through the air to the other element, thereby changing the inductance. This change may be used to vary the frequency of an oscillator for a telemetering system.

Although only one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

We claim:

1. An inductive position-signal transmitting device comprising a pair of closely associated relatively rotatable members of magnetic material, one of said members having inductance windings thereon, the other member including a cam-like element of varying radius, said cam-like element being arranged to vary the air gap between said members upon relative rotation of said members and change the inductance of the device linearly.

2. An inductive position-signal transmitting device comprising a pair of closely associated relatively rotatable members of magnetic material, one of said members having inductance windings thereon, the other member including a cam-like element of varying radius and of constant width, said element being shaped and arranged to vary the air gap between said members upon relative rotation of said members and change the inductance of the device linearly.

3. An inductive position-signal transmitting device comprising a pair of closely associated relatively rotatable members of magnetic material, one of said members having pole pieces with inductance windings thereon, the other member including a cam-like element of varying radius overhanging the pole pieces of the first member, said cam-like element being shaped and arranged to vary the air gap between said members upon relative rotation of said members and change the inductance of the device linearly.

4. An inductive position-signal transmitting device comprising a pair of closely associated relatively displaceable members of magnetic material, one of said members having inductance windings thereon, the other member including a cam-like element of varying radius, said cam-like element being shaped and arranged upon relative displacement of said members to vary the air gap between said members to change the inductance of the device linearly and producing sharp reversals at the maximum and minimum inductances to avoid plateau effects.

5. An inductive position-signal transmitting device comprising a pair of closely associated relatively displaceable members of magnetic material, one of said members having inductance windings thereon, the other member including a cam-like element of variable thickness, said cam-like element being shaped and arranged to vary the air gap between said members upon relative displacement of said members to change the inductance of the device linearly.

6. An inductive position-signal transmitting device comprising a pair of closely associated relatively displaceable members of magnetic material, one of said members having inductance windings thereon, the other member including a cam-like element of variable thickness, said cam-like element being shaped and arranged to vary the air gap between said members upon relative displacement of said members to change the inductance of the device linearly and provide sharp reversals at the maximum and minimum inductances to avoid plateau effects.

References Cited in the file of this patent

UNITED STATES PATENTS

| | | |
|---|---|---|
| 1,804,168 | Keller | May 5, 1931 |
| 1,815,717 | Kranz | July 21, 1931 |
| 2,078,796 | Greentree et al. | Apr. 27, 1937 |
| 2,431,860 | Friedlander | Dec. 2, 1947 |
| 2,541,422 | Kirkland | Feb. 13, 1951 |
| 2,630,561 | Mueller | Mar. 3, 1953 |